(12) United States Patent
Kadirvel et al.

(10) Patent No.: US 12,197,314 B2
(45) Date of Patent: Jan. 14, 2025

(54) INTELLIGENT TEST CASE PRIORITIZATION METHOD AND APPARATUS

(71) Applicant: VERIZON PATENT AND LICENSING INC., Basking Ridge, NJ (US)

(72) Inventors: Karthikeyan Kadirvel, Tamil Nadu (IN); Rajkumar Adhikesavan, Chennai (IN); Rajesh K. Pandey, Telangana (IN); Antony S. Suresh, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 17/731,446

(22) Filed: Apr. 28, 2022

(65) Prior Publication Data

US 2023/0350791 A1 Nov. 2, 2023

(51) Int. Cl.
*G06F 11/00* (2006.01)
*G06F 11/36* (2006.01)

(52) U.S. Cl.
CPC .............................. *G06F 11/3688* (2013.01)

(58) Field of Classification Search
CPC ............ G06F 11/3688; G06F 11/3612; G06F 11/3684; G06F 11/3692; G06F 11/2268
See application file for complete search history.

(56) References Cited

U.S. PATENT DOCUMENTS

| 10,860,458 | B2* | 12/2020 | Shani | G06F 11/3688 |
| 2009/0265681 | A1* | 10/2009 | Beto | G06F 11/3688 |
| | | | | 717/100 |
| 2014/0033176 | A1* | 1/2014 | Rama | G06F 11/3688 |
| | | | | 717/124 |
| 2019/0155722 | A1* | 5/2019 | Gupta | G06N 20/00 |
| 2020/0097388 | A1* | 3/2020 | Bhat | G06F 11/3608 |

(Continued)

OTHER PUBLICATIONS

Y. Fazlalizadeh, A. Khalilian, M. A. Azgomi and S. Parsa, "Prioritizing test cases for resource constraint environments using historical test case performance data," 2009 2nd IEEE International Conference on Computer Science and Information Technology, Beijing, China, 2009, pp. 190-195. (Year: 2009).*

(Continued)

*Primary Examiner* — Hanh Thi-Minh Bui

(57) ABSTRACT

Techniques for intelligent application source code testing prioritization are disclosed. In one embodiment, a method is disclosed comprising obtaining execution history information associated with a number of test cases and source code change history information, generating a plurality of encodings for a number of test cases, each test case encoding comprising a merger of a test case description and source code change history information corresponding to a test case, determining a failure propensity score for each test case using a trained failure prediction model and the test case's encoding, determining a prioritization of the test cases in accordance with the failure propensity scores, such that a test case having a greater failure propensity score indicating a greater propensity to fail having a higher priority than another test case with a lower propensity to fail, and generating a testing schedule for the plurality of test cases in accordance with the test case prioritization.

20 Claims, 12 Drawing Sheets

(56) References Cited

U.S. PATENT DOCUMENTS

2023/0176961 A1* 6/2023 Hong ................. G06F 11/3684
                                                         717/124

OTHER PUBLICATIONS

Mostafa Mahdieh et al., "Test case prioritization using test case diversification and fault-proneness estimations," arXiv, 2016, pp. 1-49. Retrieved from the Internet: <URL: https://arxiv.org/pdf/2106.10524>. (Year: 2016).*

* cited by examiner

| DESCRIPTION | BUILD DATE | STATUS | STATUS MESSAGE |
|---|---|---|---|
| 4_70MonthlySubmissionThrough... | 2021-07-23 | FAILED | exception occurred! user landed on... |
| 1_PayAsYouGoCallingPlan... | 2021-09-19 | FAILED | exception occurred! user landed on... |
| 4_NSO_MobileOS_Apple_Smartphone... | 2021-09-27 | SUCCESS | null |
| 2_NSO_MobileAndroid_EPP_Random... | 2021-08-06 | FAILED | exception occurred! user landed on... |
| 11_PayAsYouGoSubmissionNext... | 2021-10-12 | FAILED | data exception occurred! |

| COMMIT DATE | FILE NAME |
|---|---|
| 2021-07-23 | .../pos/tests/.../indirectNSAAddaLine.java |
| 2021-09-19 | .../java/com/.../pos/pages/NSALandingPage.java |
| 2021-09-27 | .../com/...pages/OrderConfirmationPage.java |
| 2021-08-06 | .../com/...pages/SignatureCapturePage.java |
| 2021-10-12 | .../com/...digital/automation/ecom/pages... |

Figure 3

| BUILD DATE | ENCODED STATUS | ENCODED DESCRIPTION |
|---|---|---|
| 2021-07-23 | 1 | [24, 73, 26, 27, 28, 29, 70, 66, 71, 72] |
| 2021-09-19 | 1 | [384, 385, 145, 283, 137, 146, 257, 263, 139] |
| 2021-09-27 | 0 | [24, 17, 188, 27, 65, 89, 293, 155, 296, 47, 101] |
| 2021-08-06 | 1 | [133, 378, 146, 283, 255, 137, 30, 461, 381] |
| 2021-10-12 | 0 | [91, 874, 795, 700, 17, 48, 186, 25, 104, 1008] |

| COMMIT DATE | ENCODED CHANGE HISTORY |
|---|---|
| 2021-07-23 | [0, 0, 0, 0, 0, 0, 0, 0, 0, 0, 0, 0, 0, 0, 0, ...] |
| 2021-09-19 | [0, 0, 0, 0, 0, 0, 0, 0, 0, 0, 0, 0, 0, 0, 0, ...] |
| 2021-09-27 | [0, 0, 0, 0, 0, 0, 0, 0, 0, 0, 0, 0, 0, 0, 0, ...] |
| 2021-08-06 | [0, 0, 0, 0, 0, 1, 0, 0, 3, 3, 0, 0, 0, 0, 0, ...] |
| 2021-10-12 | [0, 0, 0, 0, 0, 0, 0, 6, 3, 3, 1, 0, ...] |

Figure 4

| BUILD DATE / COMMIT DATE | ENCODED STATUS | ENCODED DESCRIPTION | ENCODED CHANGE HISTORY |
|---|---|---|---|
| 2021-07-23 | 1 | [24, 73, 26, 27, 28, 29, 70, 66, 71, 72] | [0, 0, 0, 0, 0, 0, 0, 0, 0, 0, 0, 0, 0, 0, 0, ...] |
| 2021-09-19 | 1 | [384, 385, 145, 283, 137, 146, 257, 263, 139] | [0, 0, 0, 0, 0, 0, 0, 0, 0, 0, 0, 0, 0, 0, 0, ...] |
| 2021-09-27 | 0 | [24, 17, 188, 27, 65, 89, 293, 155, 296, 47, 101] | [0, 0, 0, 0, 0, 0, 0, 0, 0, 0, 0, 0, 0, 0, 0, ...] |
| 2021-08-06 | 1 | [133, 378, 146, 283, 255, 137, 30, 461, 381] | [0, 0, 0, 0, 0, 1, 0, 0, 3, 3, 0, 0, 0, 0, 0, ...] |
| 2021-10-12 | 0 | [91, 874, 795, 700, 17, 48, 186, 25, 104, 1008] | [0, 0, 0, 0, 0, 0, 0, 0, 6, 3, 3, 3, 1, 0, ...] |

Figure 5

INTELLIGENT TEST CASE PRIORITIZATION METHOD AND APPARATUS

BACKGROUND INFORMATION

A software build typically involves application source code that can be compiled, or interpreted, and executed by a computing device. The application source code can correspond to all or some portion of a software application. Before a software application is made available to users, it typically undergoes testing to certify its readiness for production and roll out to the users. The testing and certification process can involve one or more test cases, each of which can focus on testing one or more aspects of the software application. Software testing and certification can be time consuming and can cause delays in making a software application available to users.

BRIEF DESCRIPTION OF THE DRAWINGS

FIG. 3 provides examples of execution and change history information for use in model training in accordance with one or more embodiments of the present disclosure;

FIG. 4 provides examples of data generated by description encoder, code status encoder and change history encoder in accordance with one or more embodiments of the present disclosure;

FIG. 5 provides examples of training instances that can be generated in accordance with one or more embodiments of the present disclosure;

DETAILED DESCRIPTION OF EXAMPLE EMBODIMENTS

Figure 1:
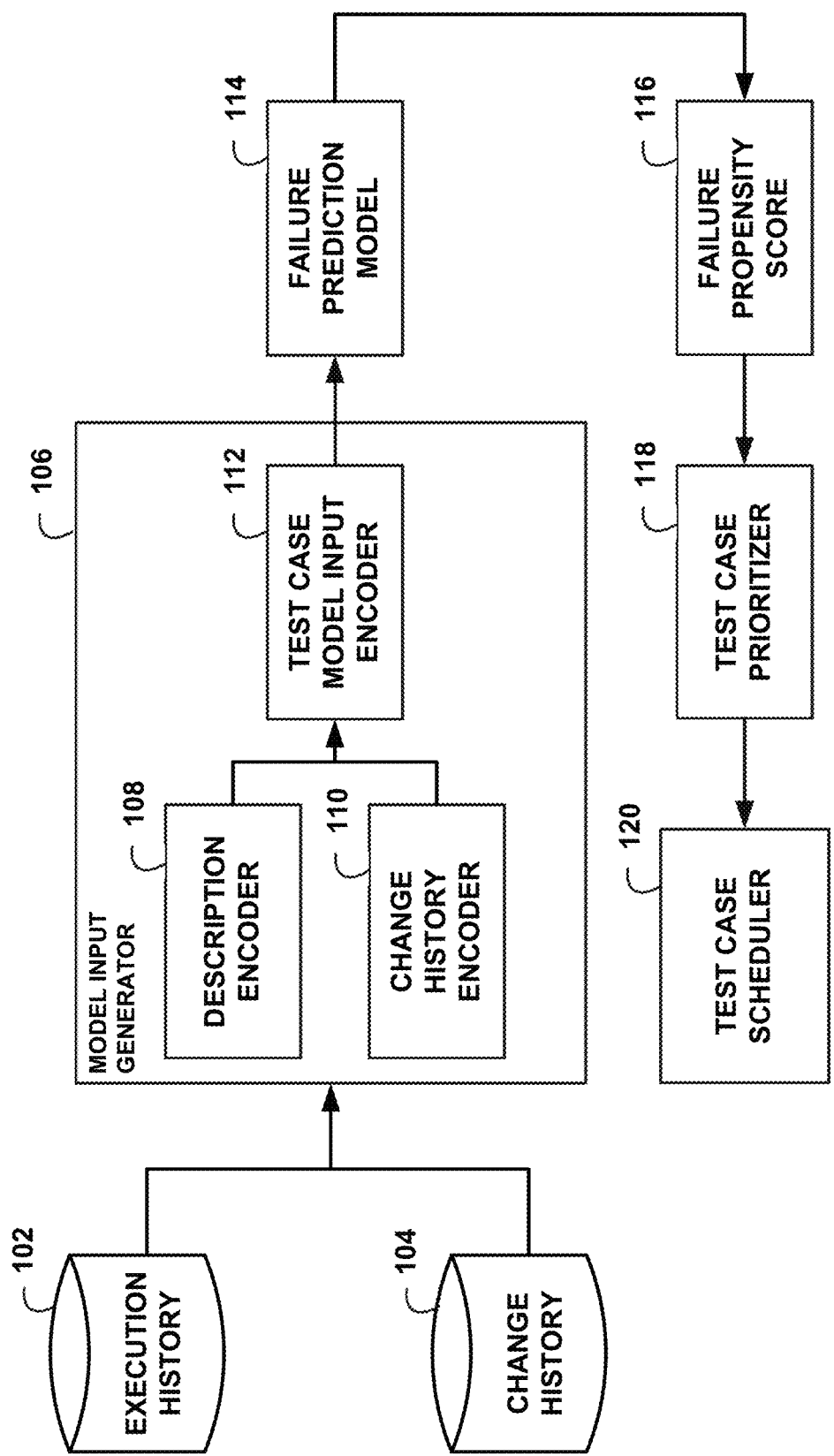
FIG. 1 provides an example illustrating testing prioritization in accordance with one or more embodiments of the present disclosure.

Techniques for intelligent application source code testing prioritization are disclosed. Disclosed embodiments can be used to dynamically predict an application code failure using a model (e.g., a machine learning model) trained to output a probability, or likelihood, of such a failure. The probability, or likelihood, of this failure determined by a trained model can be referred to as a failure propensity score. In accordance with one or more embodiments, the failure propensity score can be used to prioritize a testing schedule. In accordance with one or more embodiments, a deep learning model is used to generate a failure propensity score.

In accordance with one or more embodiments, a failure propensity score can be determined for each of a number of test cases, and used to prioritize and schedule the test cases. A test case can be used with a computer-executable version of source code to test the source code. A test case can measure functionality of the code (e.g., the source code and its corresponding computer-executable version) across a set of actions or conditions to verify whether or not an expected result (e.g., a specific requirement) is achieved. By way of a non-limiting example, a test case can comprise information defining some or all of the following: a set of test data, preconditions, expected results, and post conditions. A test case can be developed for a particular testing scenario to verify compliance against a set of requirements.

Code can be used herein to refer to source code as well as a computer-executable version of the source code. A computer executable version of source code can be generated by a compiler, interpreter, etc. Embodiments of the present disclosure can be used with any computer-executable formats. The computer-executable version of source code can be referred to as a build.

By way of a non-limiting example, a test case with a corresponding failure propensity score indicating a higher propensity for failure (e.g., due to one or more code issues) can be given priority so that it is tested (e.g., executed) before other test cases. By way of another non-limiting example, test cases can be ordered (or ranked, sorted, etc.) using their corresponding failure propensity scores (e.g., from highest propensity to fail to lowest propensity to fail), and the resulting order can be used to determine a testing order (e.g., with those test cases having higher failure propensity scores being tested prior to test cases with lower failure propensity scores.

In accordance with one or more embodiments, test case scheduling can involve determining whether or not to schedule testing of a test case. By way of a non-limiting example, failure propensity threshold can be used with a test case's failure propensity score to determine whether the failure propensity score fails to satisfy the threshold. In accordance with one or more embodiments, test case scheduling can include removing from the test case schedule a test case having a corresponding failure propensity score that does not satisfy (or meet) the threshold.

Unsuccessful testing encountered at any point during an application program's development can result in delayed launch of the application program. While a disruption to the development process caused by failed testing is impactful throughout the process, a failed test is likely to be more impactful later in the development process. In addition, modifying code to address a failed test can involve changes outside of the particular code that failed, which can result in retesting code that has already been successfully tested. Testing prioritization according to embodiments of the present disclosure alleviate issues associated with failed testing encountered in application program development.

FIG. 1 provides an example illustrating testing prioritization in accordance with one or more embodiments of the present disclosure. In accordance with one or more embodiments, failure prediction model 114 can be trained using training data and a machine learning algorithm to determine a failure propensity score 116 for a test case using model input generated by model input generator 106 using execution history 102 and change history 104 information corresponding to the test case. The failure propensity score generated by failure prediction model 114 for each of a number of test cases can be used by test case prioritizer 118 to order (rank, sort, etc.) the test cases. Test case scheduler 120 can determine a testing schedule for the test cases in accordance with the order determined by test case prioritizer 118. By way of a non-limiting example, the test cases determined to have a higher propensity (likelihood, probability, etc.) to fail can be ranked above each test case having a lower propensity, such that the each test case with a greater propensity to fail (e.g., a higher propensity score) can be tested (e.g., executed) before other test cases based on the failure propensity score 116 associated with each test case.

In accordance with one or more embodiments, test case scheduler 120 can determine whether or not to schedule testing of a test case. By way of a non-limiting example, test case scheduler 120 can use a failure propensity threshold can be used with a test case's failure propensity score to determine whether the failure propensity score fails to satisfy the threshold. By way of a non-limiting example, a test case with an associated failure propensity score that is greater than the threshold can be identified by test case scheduler 120. In accordance with one or more embodiments, test case scheduler 120 can then elect to remove the test case from the schedule. In accordance with one or more embodiments, a test case's failure propensity score can be used to determine a testing schedule for the test case as well as to determine whether or not to even run the test case. In accordance with one or more embodiments, test case scheduling can include removing from the test case schedule a test case having a corresponding failure propensity score that does not satisfy (or meet) the threshold. A test case with a corresponding failure propensity score that fails to meet the failure propensity threshold can be considered to likely result in a number of code issues, if executed. Computing resources that would have been used for execution of such a test case can be conserved (or used for another test case).

Model input generator 106 can use information from execution history 102 and change history 104 to generate the model input corresponding to each test case. Execution history 102 can comprise information about each execution (or run) of a build. Each build can correspond to one or more test cases. Execution history 102 can comprise information for a number of builds for each test case. Information in execution history 102 can be used to associate each build with one or more test cases. For a given test case, execution history 102 can comprise information indicating a date of a corresponding build (or build date), a description of the test case (or test case description) being tested by the build, an execution status (or outcome), a status message, and information identifying the application program associated with the test case. The status message can provide further information regarding the status of the execution (or run). By way of a non-limiting example, the status message can indicate a reason for a failed execution.

In accordance with one or more embodiments, description encoder 108 can encode a test case's description to generate an encoded description (e.g., a vector, array, etc.) using a vocabulary comprising a number of elements (e.g., words, sequences of numbers, sequences of characters, etc.) and a mapping of each vocabulary element to an encoding value (e.g., a value, such as a number, to be used in the encoded description). By way of a non-limiting example, the word "submission" can be mapped to an encoding value, such as "47". Description encoder 108 can parse the test cast description for a given test case to find each vocabulary element (e.g., a word, sequence of characters/numbers, etc.) in the test case description, use the mapping to determine a corresponding encoding value for each vocabulary element found in the test case description and generate an encoded description using the determined encoding values.

Change history 104 can comprise information identifying source code changes. By way of a non-limiting example, updated source code can be saved (or committed) to a repository (or other storage unit). Each time the updated source code is modified and saved, an entry can be added to change history 104. In the case that the updated source code is saved (or committed) to storage (e.g., a file, repository, etc.), the change history 104 can include change history information (e.g., a record) comprising the name (e.g., a file name) associated with the source code and associated temporal information (e.g., date, time, etc.). By way of one non-limiting example, code modifications can be saved, or committed, to a change versioning system. While a file is used herein as one example of a storage unit used to store (or commit) code, it should be apparent that any unit or type of storage can be used.

In accordance with one or more embodiments, change history encoder 110 can retrieve change history information from change history 104 for each test case for which a failure propensity score is to be determined by failure prediction model 114. By way of a non-limiting example, the change history information retrieved for a given test case can indicate each file that has been committed to during a determined time period. By way of a non-limiting example, the time period can be determined using a last-release date (e.g., date of the last release) associated with the test case and the build date of the test case. The change history information can be used to generate an encoded change history (e.g., a vector, array, etc.) for the test case.

In accordance with one or more embodiments, the encoded change history 416, 516 shown in FIG. 4 and FIG. 5, respectively, for a given test case can comprise an indicator for each file being tracked in change history 104. By way of a non-limiting example, assuming that there are n files with change history information in change history 104, the encoded change history 416, 516 can comprise n indicators (e.g., binary digits, or bits), each of which corresponds to one of the n files. For a given test case, the encoded change history 416, 516 can indicate each file that has been modified during a time period determined for the test case (e.g., determined using the test case's release date and build date).

In accordance with one or more embodiments, change history encoder 110 can query change history 104 to retrieve information identifying each file modified during the determined time period. The retrieved information can then be used by change history encoder 110 to generate an encoded change history corresponding to a test case. The encoded change history can indicate whether or not each of the n files was modified during the determined time period. By way of a non-limiting example, a value of "0" can be used by change history encoder 110 to indicate no change and a value of "1" can be used by change history encoder 110 to indicate a change. Of course, any value can be used to indicate the presence or absence of a change.

In accordance with one or more embodiments, test case model input encoder 112 can generate the model input for each test case for which a failure propensity score is to be determined. By way of a non-limiting example, test case model input generator can combine (or merge) an encoded description of a test case with an encoded change history corresponding to the test case. In accordance with one or more embodiments, test case model input encoder 112 can generate an encoding (e.g., for a test case) that can be a combination, or merger, of an encoded description and encoded change history for each test case for which a failure propensity score 116 is to be determined.

A test case's encoding can become input to failure propensity model 114, which can use the model input to generate a failure propensity score 116 corresponding to the test case. As discussed, a failure propensity score 116 can be generated for each test case and then used by test case prioritizer 118 to prioritize the test cases. The test case prioritization generated by test case prioritizer 118 can be used by test case scheduler 120 to schedule the test cases. By way of a non-limiting example, the test case schedule determined by test case scheduler 120 can be used to schedule the execution (or run) of each test case. By way of a further non-limiting example, the test case schedule can prioritize the test cases in order of each test case's failure propensity score 116, such that a first test case with the greater propensity to fail (relative to a second test case) is scheduled for testing before the second test case.

Figure 2:
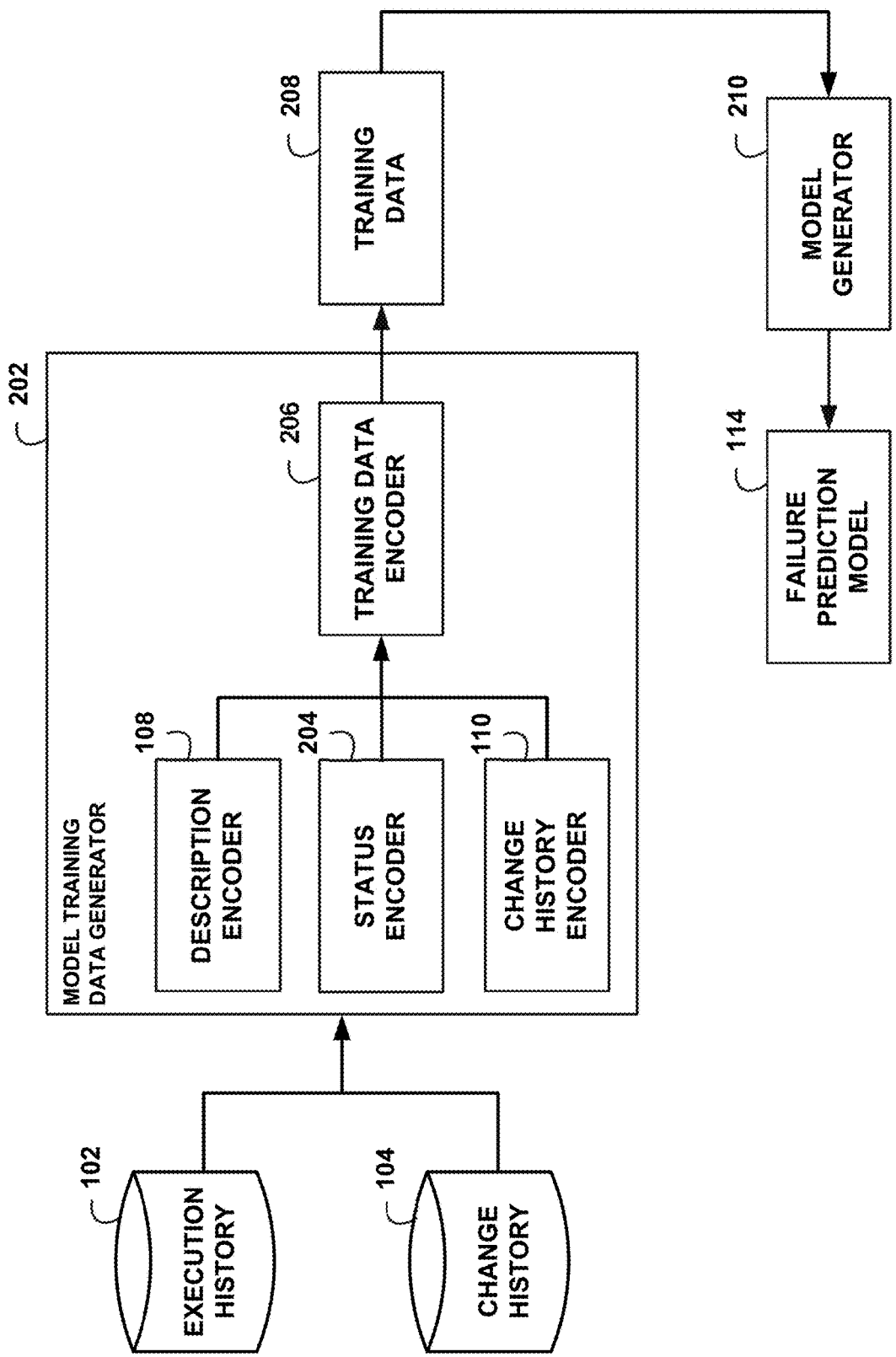
FIG. 2 provides an example illustrating failure prediction model training in accordance with one or more embodiments of the present disclosure.

In accordance with one or more embodiments, failure prediction model 114 can be a machine model trained to generate failure propensity score 116 using a test case's encoded input. FIG. 2 provides an example illustrating failure prediction model training in accordance with one or more embodiments of the present disclosure. As with failure propensity score generation discussed in connection with FIG. 1, failure prediction model training can use information from execution history 102 and change history 104. Information retrieved from execution history 102 and change history 104 can be used to generate the training data, and the retrieved information can correspond to a particular time frame—e.g., a predetermined, or other, time frame, for training purposes.

In accordance with one or more embodiments, information retrieved from execution history 102 and change history 104 can be used to generate testing data to test the trained model, and the retrieved information can correspond to another (e.g., predetermined) time frame used for testing purposes. In accordance with one or more embodiments, testing can provide feedback which can be used to update the model to improve the model's accuracy and precision. By way of a non-limiting example, testing data can be generated in a manner similar to that described in connection with FIG. 1. Model input generator 106 can generate encoded input for each of a number of test cases selected for testing the model. Each test case of the number of test cases is run and the resulting outcome is known. The encoded input of the number of test cases can be provided to failure propensity model 114 to obtain a number of failure propensity scores 116, which can be compared to the known outcomes to determine the model's accuracy and precision. The accuracy and precision information determined for the model can be used to refine (e.g., change one or more model parameters of) the model.

In accordance with one or more embodiments, results generated from running test cases scheduled by test case scheduler 120 can be used as feedback. By way of a non-limiting example, a test case's failure propensity score 116 can be compared to information (e.g., status 308 and status message 310 of FIG. 3) indicating an actual outcome of running the test case to determine whether the failure propensity score 116 accurately predicted the actual outcome. In accordance with one or more embodiments, identified inaccuracies can indicate a need to update failure prediction model 114. In accordance with one or more embodiments, the model 114 can be updated using training data including training instances generated from the test cases whose failure propensity scores 116 failed to accurately predict the actual outcome of the test cases.

Turning to model training, embodiments of the present disclosure can map historical execution information with change history information, and generate training data using the mapping. In accordance with one or more embodiments of the present disclosure, the training data can include a code issue indicator determined using the historical execution information.

In accordance with one or more embodiments, in addition to description encoder 108 and change history encoder 110 discussed in connection with FIG. 1, model training data generator 202 comprises a status encoder 204. Status encoder 204 can be used to generate a supervised learning label for each training data instance indicating the status (or outcome) of a test case execution.

FIG. 3 provides examples of execution and change history information for use in model training in accordance with one or more embodiments of the present disclosure. Example 302 includes exemplary information that can be retrieved from execution history 102 for use by description encoder 108 and status encoder 204. Example 312 includes exemplary information that can be retrieved from change history 104 for use by change history encoder.

In accordance with one or more embodiments, execution history 102 can comprise a number of records. Each record can correspond to a particular test case execution, or run. By way of a non-limiting example, the test case execution can be done to test a current computer-executable version of source code, such as a component of a software program application. The term build as it is used herein refers to computer executable version of the entire set of source code associated with a particular project or application. Each record in execution history 102 can correspond to a test case execution, or run, and can comprise, as shown in example 302, a description 304, build date 306, status 308 and status message 310.

By way of some non-limiting examples, the build date 306 can be the date that a build process is used to convert source code into computer-executable code. Running a test case can comprise execution of the source code's build (e.g., by one or more computing devices) in a testing environment (e.g., using the test data, etc.) specified by the test case, and can generate information indicating an outcome of the execution, such as and without limitation status 308 and status message 310. Status 308 can comprise information indicating whether the execution completed successfully or failed. Status message 310 can include additional information about the outcome of the execution. In a case that the execution failed, status message 310 can provide information indicating a reason for the execution failure.

In accordance with one or more embodiments, each training instance (of training data 208) used to train failure prediction model 114 can be generated using test case execution information such as that shown in example 302 (which includes information about a number of test-case executions) and change history information such as that shown in example 312 (which includes information about a number of source code changes).

In accordance with one or more embodiments, information in change history 104 can comprise information indicating changes in source code used to generate the builds from execution history 102. Each record in change history 104 can correspond to a commit (or save) operation. A commit (or save) operation can be used to indicate that a change was made to source code. By way of a non-limiting example, a commit operation can comprise a process in which source code is saved to a repository. The change history 104 information can comprise, for each commit operation, temporal information (e.g., a date and time) and a name (e.g., file name) associated with the source code being committed (or saved).

By way of a non-limiting example, each change can be stored, or committed, using a software tracking system such as Git, which can be queried to retrieve change log information for a given time frame (e.g., a training time frame).

Each row in example 312 corresponds to a record in change history 104 and comprises a commit date 314 indicating the date of the commit operation and a file name 316 indicating the name of the file involved in the commit operation.

In accordance with one or more embodiments information in examples 302 and 312 is encoded resulting in encoded data that is merged to generate training data 208. FIG. 4 provides examples of data generated by description encoder 108, status encoder 204 and change history encoder 110. Description encoder 108 can operate in a manner described in connection with FIG. 1 and use information retrieved from execution history 102, such as the information shown in example 302, to generate the data shown in example 402. Status encoder 204 can use status 308 and status message 310 to generate an encoded status 406, as is discussed in more detail below. Change history encoder 110 can operate in manner described in connection with FIG. 1 and use information retrieved from change history 104, such as the information shown in example 312, to generate the data shown in example 412.

In accordance with one or more embodiments, description encoder 108 can encode the description 304 in a record in example 302 to generate an encoded description 408. As discussed herein, each element of a vocabulary usable in a test case description can be mapped to an encoding value. Description encoder 108 can encode a test case's description to generate an encoded description (e.g., a vector, array, etc.) using a test case description vocabulary comprising a number of elements (e.g., words, sequences of numbers, sequences of characters, etc.). Each element of the vocabulary can be mapped to an encoding value (e.g., a value, such as a number).

Description encoder 108 can parse a test cast description to find each vocabulary element (e.g., a word, sequence of characters/numbers, etc.) in the description, use the mapping to determine a corresponding encoding value for each vocabulary element found in the description and generate an encoded description 408 using the determined encoding values.

In accordance with one or more embodiments, status encoder 204 can use status 308 and status message 310 to determine a code status and generate an encoded status. In accordance with one or more such embodiments, referring to example 302, status encoder 204 uses status 308 and status message 310 to determine the presence or absence of a code issue.

In accordance with or more such embodiments, status encoder 204 can analyze the status 308 as an initial determiner. If the status 308 indicates a successful execution completion (e.g., the "SUCCESS" indicator), such as in the third data record in example 302, status encoder 204 can determine that there is no code issue. If the status 308 indicates something other than a successful completion (e.g., the "FAILED" indicator) shown in records 1, 2, 4 and 5 of example 302, status encoder 204 can analyze the contents of the corresponding status message 310 to determine whether an unsuccessful completion is due to an issue with the source code (e.g., source code committed during the time period used to generate the encoded change history 416, 516).

Examples of reasons for a failed completion other than an issue with the source code used to generate the build include, without limitation: a data error, an environment error (e.g., an operating system error) or an issue involving the platform (e.g., computing device, communications network, etc.) used to execute the build. The analysis of the status message 310 by status encoder 204 can comprise analyzing the contents of the status message 310 to determine whether or not the cause of the failed execution is due to a source code (coding or code) issue. Referring to examples 302 and 402, by virtue of the analysis performed by status encoder 204, the failed executions associated with records 1, 2 and 4 can be determined to be caused by a code issue, and the failed execution associated with record 5 can be determined to be caused by a type of issue (e.g., a data error) other than a code issue.

In accordance with one or more embodiments, change history encoder 110 can query change history 104 using a range of dates corresponding to the time frame determined for training purposes to retrieve information identifying each file modified during that time frame. The retrieved information can then be used by change history encoder 110 to generate an encoded change history for each date within the time frame's range of dates. Alternatively, the retrieved information can be used by change history encoder 110 to generate an encoded change history 416 for each build date corresponding to at least one encoded description 408.

An encoded change history 416 generated by change history encoder 110 can comprise information identifying source code changes associated with a given date in the time frame's range of dates. In accordance with one or more embodiments, an encoded change history 416 for a given date can comprise an indicator for each file being tracked in change history 104. By way of a non-limiting example, for a given date, the encoded change history 416 can comprise n indicators (e.g., binary digits, or bits), each of which corresponds to one of the n files being tracked in change history 104. For a given date, the encoded change history 416 can indicate each file that has been saved on the given date.

By way of a non-limiting example, encoded change history 416 can comprise an encoding value (e.g., a binary value of "0" or "1") for each of the number (e.g., n) files being tracked in change history 104. By way of a further non-limiting example, a value of "0" can be used as an encoding value to indicate an absence of an update and a value of "1" can be used as an encoding value to indicate the presence of an update. Of course, any value can be used to indicate the presence or absence of an update.

As can be seen in examples 402 and 412, each encoded status 406, encoded description 408 and encoded change history 416 has a corresponding date. Training data encoder 206 can use the corresponding dates to associate an encoded status 406, encoded description 408 and encoded change history 416 for a given date. Training data encoder 206 can use the associated encoded status 406, encoded description 408 and encoded change history 416 to generate a training instance for inclusion in the training data 208, which can be used by model generator 210 to train failure prediction model 114.

FIG. 5 provides examples of training instances that can be generated in accordance with one or more embodiments of the present disclosure. In example 502, column 504 is shown to illustrate the association between build data and change history date used by training data encoder. In accordance with one or more embodiments, each training instance can comprise an encoded status 506 (determined by status encoder 204), an encoded description 508 (determined by description encoder 108) and an encoded change history 516 (determined by change history encoder 110. In example 502, encoded status 406 can be determined by status encoder 204 using status 308 and status message 310. In accordance with one or more embodiments, status encoder 204 can using a binary encoding value to generate encoded status 406, 506. As shown in example, 502, encoded status 406, 506 can use "0" to indicate an absence of code issue and "1" to indicate the presence of a code issue.

Training data encoder 206 can use the build date 404 from the records in example 402 and the date 414 from the records in example 412 to merge an encoded status 406 and encoded description 408 with an encoded change history 416 with matching temporal information (e.g., a matching date). In the examples shown in FIGS. 3-5, the temporal information is a calendar date. However, it should be apparent that any information, including additional or other temporal information, can be used as a criteria for merging encoded status 406, 506, encoded description 408, 508 and encoded change history 416, 516.

Referring again to examples 502, the date "2021-07-23" is found in the first records from examples 402 and 412. Training data encoder 206 can identify the matching dates and merge an encoded status 406, encoded description 408 and encoded change history 416 in first record from each of examples 402 and 412 resulting in the encoded status 506, encoded description 508 and encoded change history 516 in the first record of example 502. The encoded status 506, encoded description 508 and encoded change history 516 shown in the remaining records in example 502 can be merged in a similar manner. In example 502, column 504 labeled "BUILD DATE/DATE" illustrates date match made by training data encoder 206.

In accordance with one or more embodiments, the training data can comprise a number of training instances, each of which can comprise an encoded status 506, encoded description 508 and encoded change history 516. As discussed, encoded description 508 can comprise an encoded value for each vocabulary element. The length of test case descriptions can vary. In some embodiments, encoded description 508 can have a fixed length with any empty spaces being filled with a padder value (e.g., a predefined, or other, value not used for encoding).

Referring again to FIG. 2, training data 208 can comprise a number of training instances, each of which can comprise an encoded status 506, encoded description 508 and encoded change history 516 corresponding to a given date (which corresponds to a build date 404 and date 414 (or change history date 414). The training data 208 is used by model generator 210 to generate failure prediction model 114 trained to provide a failure propensity score 116.

As discussed in connection with FIG. 1, the output of test case model input encoder 112 can become input to failure prediction model 114. In accordance with one or more embodiments, an instance corresponding to a test case and generated by test case model input encoder 112 can comprise encoded description 508 (generated by description encoder 108) and encoded change history 516 (generated by change history encoder 110).

In accordance with one or more embodiments, the training data 208 can be used to learn associations between test cases and modified code and associations between modified code and failed test case executions. Failure prediction model 114 can learn these associations even in a case that there is no prior mapping between the code and each test case.

As discussed herein in accordance with one or more embodiments, each instance of training data 208 associates code modifications made on a date corresponding to a build date associated with a respective test case. For example, as discussed herein, each code modification can have an associated commit date 314, 414, which can be used to generate an encoded change history 416, 516 for a respective commit date 314, 414. The encoded change history 416, 516 identifies whether or not a modification was made to a respective piece of code on the commit date 414. The commit date 414 associated with an encoded change history 416, 516 can be matched with an encoded description 408, 508 (determined for a test case) using the build date 306, 404 associated with the test case. In addition, the model generator 210 can use the encoded status 406, 506 provided with a number of training instance to train the failure prediction model 114 to associate an execution failure (or execution success) with the modified code identified in each training instance.

In accordance with one or more embodiments, the learned associations between test cases and modified code and between modified code and failed (or successful) test case executions can be used by the failure prediction model 114 to determine a test case's failure propensity score 116 given the model input (e.g., an encoded description 408, 508 and an encoded change history 416, 516) determined for the test case by test case model input encoder 112. In accordance with one or more embodiments, failure prediction model 114 can use the learned associations to make inferences about which code is being tested and whether such code is prone to failure (or is likely to encounter some type of issue during execution), or is likely to succeed.

Figure 6:
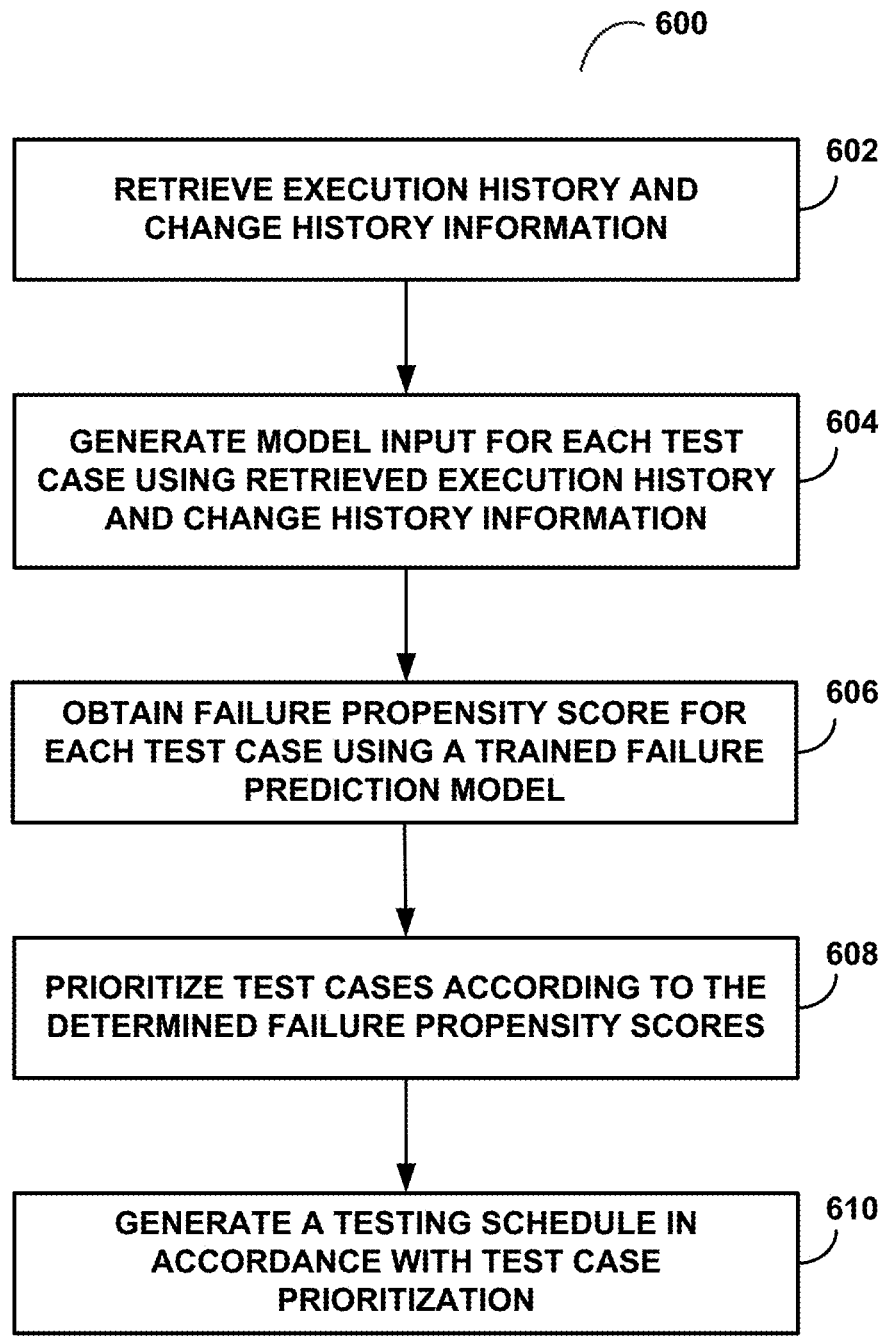
FIG. 6 provides a test case prioritization process flow in accordance with one or more embodiments of the present disclosure.

FIG. 6 provides a test case prioritization process flow in accordance with one or more embodiments of the present disclosure. Process 600 can be performed using components shown in FIG. 1. In accordance with one or more embodiments of the present disclosure, process 600 can be performed in response to a prioritization request from a user. The received request can identify the test cases to be prioritized, criteria for identifying the test cases, or some combination thereof. Process 600 can use information from execution history 102 and change history 104 to generate model input corresponding to each test case that is to be prioritized and scheduled according to the failure propensity score 116 determined for each test case by failure propensity model 114.

At step 602, execution history and change history information can be retrieved. Step 602 can be performed by description encoder 108 (to retrieve information from execution history 102) and change history encoder 110 (to retrieve change history information from change history 104). By way of a non-limiting example, description encoder 108 (can retrieve a description 304 of each test case from execution history 102, and change history encoder 110 can retrieve (from change history 104) change history information identifying each source code change (e.g., the file name of each updated file) associated with each of the test cases for which a failure propensity score 116 is to be determined.

In accordance with one or more embodiments, description encoder 108 can encode a test case's description to generate an encoded description 408, 508 (e.g., a vector, array, etc.)

using a vocabulary comprising a number of elements (e.g., words, sequences of numbers, sequences of characters, etc.) and a mapping of each vocabulary element to an encoding value (e.g., a value, such as a number, to be used in the encoded description). By way of a non-limiting example, the word "submission" can be mapped to an encoding value, such as "47". Description encoder 108 can parse the test cast description for a given test case to find each vocabulary element (e.g., a word, sequence of characters/numbers, etc.) in the test case description, use the mapping to determine a corresponding encoding value for each vocabulary element found in the test case description and generate an encoded description using the determined encoding values.

In accordance with one or more disclosed embodiments, change history 104 can comprise file name 316 information corresponding to each test case. By way of a non-limiting example, the change history information retrieved for a given test case can indicate each file that has been saved during a determined time period. By way of a non-limiting example, the time period can be determined using a last release date (date of the last release) associated with the test case and the build date of the test case. The change history information can be used to generate an encoded change history (e.g., a vector, array, etc.) for the test case.

In accordance with one or more embodiments, the encoded change history 416, 516 for a given test case can comprise an indicator for each file being tracked in change history 104. By way of a non-limiting example, assuming that there are n files with change history information in change history 104, the encoded change history 416, 516 can comprise n indicators (e.g., binary digits, or bits), each of which corresponds to one of the n files. For a given test case, the encoded change history 416, 516 can indicate each file that has been saved during a time period determined for the test case (e.g., determined using the test case's release date and build date).

At step 604, model input can be generated for each test case using the retrieved execution history and change history information. Step 604 can be performed by test case model input encoder 112, which can generate model input for each test case. For a given test case, description encoder 108 can generate encoded description 408, 508 by encoding the test case description retrieved from execution history 102, change history encoder 110 can generate encoded change history 416, 516 by encoding the change history information corresponding to the test case, and test case model input encoder 112 can generate an encoding by merging the encoded description 408, 508 (generated by description encoder 108) and the encoded change history 416, 516 (generated by change history encoder 110).

In accordance with one or more embodiments, test case model input encoder 112 can merge an encoded description 408, 508 of a test case with an encoded change history 416, 516 determined for the test case to generate an encoding for the test case. By way of a non-limiting example, the encoding determined for the test case by test case model input encoder 112 can comprise a concatenation of encoded description 408, 508 and encoded change history 416, 516. Of course, any type of combination can be used to merge the encoded description 408, 508 and encoded change history 416, 516.

At step 606, a failure propensity score can be obtained for each test case using a trained failure prediction model. By way of a non-limiting example, failure prediction model 114 can determine a failure propensity score 116 for each test case using each test case's respective encoding (e.g., a combination of the encoded description 408, 508 and encoded change history 416, 516) determined for each test case at step 604.

At step 608, the test cases can be prioritized according to each test case's failure propensity scores. By way of a non-limiting example, the test cases for which failure propensity scores 116 are generated (at step 606) by failure prediction model 114 (using a respective encoding determined by test case model input encoder 112) can be ordered (or ranked, sorted, etc.), by test case prioritizer 118 based on their failure propensity scores 116 (e.g., from highest propensity to lowest). By way of a non-limiting example, a test case with a greater failure propensity score 116 can indicate a greater propensity for failure, and can therefore be prioritized before each test case with a lesser failure propensity score 116.

At step 610, a testing schedule can be generated in accordance with the test case prioritization. By way of a non-limiting example, the prioritized order determined at step 608 can be used by prioritized test case execution scheduler 120 to determine a testing schedule (e.g., with those test cases having higher failure propensity scores being scheduled for testing prior to test cases with lower failure propensity scores). By way of a further non-limiting example, the test cases determined to have a higher propensity (likelihood, probability, etc.) to fail can be ranked above each test case having a lower propensity, such that the each test case with a greater propensity to fail (e.g., a higher propensity score) can be executed before other test cases based on the failure propensity score 116 associated with each test case.

In accordance with one or more embodiments, test case scheduling can involve determining whether or not to schedule testing of a test case. By way of a non-limiting example, a failure propensity threshold can be used with a test case's failure propensity score to determine whether the failure propensity score fails to satisfy the threshold. In accordance with one or more embodiments, test case scheduling (performed at step 610 by test case scheduler 120) can include removing from the test case schedule a test case having a corresponding failure propensity score that does not satisfy (or meet) the threshold.

Referring again to step 604, model input can be generated for each test case using the retrieved execution history and change history information.

Figure 7:
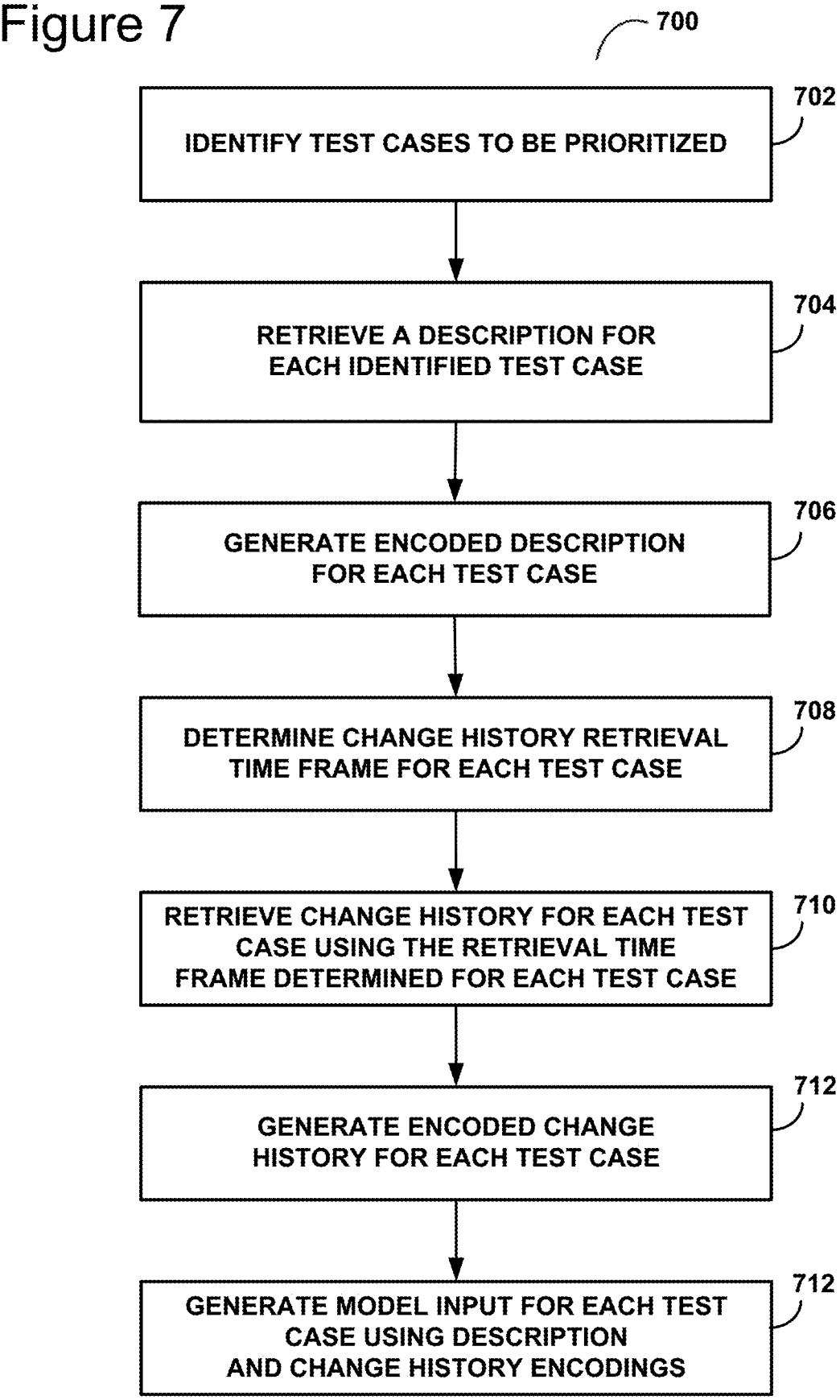
FIG. 7 provides a failure prediction model training process flow in accordance with one or more embodiments of the present disclosure.

FIG. 7 provides a model input generation process flow in accordance with one or more embodiments of the present disclosure. By way of a non-limiting example, process 700 can be performed by model input generator 106.

At step 702, test cases to be prioritized can be identified. By way of a non-limiting example, the test cases can be those test cases for which a build has been generated but have not yet been tested (e.g., executed or run).

At step 704, a description can be retrieved for each identified test case. By way of a non-limiting example, description encoder 108 can retrieve a description for each identified test case from execution history 102. Example 302 provides some non-limiting test case description 304 examples that can be retrieved by description encoder 108.

At step 706, an encoded description can be generated for each test case. By way of a non-limiting example, description encoder 108 can generate an encoded description 408, 508 using a description retrieved for each test case from execution history 102.

In accordance with one or more embodiments, description encoder 108 can encode a test case's description 304 to generate an encoded description (e.g., encoded description 408, 508) using a vocabulary comprising a number of elements (e.g., words, sequences of numbers, sequences of characters, etc.) and a mapping of each vocabulary element to an encoding value (e.g., a value, such as a number, to be used in the encoded description). By way of a non-limiting example, the word "submission" can be mapped to a numeric value, such as "47". Description encoder 108 can parse the description 304 for a given test case to find each vocabulary element (e.g., a word, sequence of characters/numbers, etc.) in the description 304, use the mapping to determine a corresponding encoding value for each vocabulary element found in the description 304 and generate an encoded description 408, 508 using the determined encoding values.

At step 708, a file change history retrieval time frame can be determined for each test case. In accordance with one or more embodiments, change history encoder 110 can determine a retrieval time frame for a given test case based on a current build date corresponding to the given test case and a previous release date (e.g., the date on which the application source code corresponding to the test case was previously released).

At step 710, change history information can be retrieved for each test case using the retrieval time frame determined for each test case. By way of a non-limiting example, change history encoder 110 can retrieve change history information from change history 104 using the retrieval time frame determined for each test case. Example 312 includes exemplary change history information that can be retrieved from change history 104 for use by change history encoder 110.

At step 712, an encoded change history can be generated for each test case. By way of a non-limiting example, change history encoder 110 can generate an encoded change history 416, 516 for a test case using the change history information retrieved from change history 104 using the retrieval time frame determined for the test case. In accordance with one or more embodiments, the encoded change history 416, 516 can indicate whether or not each of the n files was updated during the determined retrieval time frame. By way of a non-limiting example, a value of "0" can be used by change history encoder 110 to indicate no update and a value of "1" can be used by change history encoder 110 to indicate an update. Of course, any value can be used to indicate the presence or absence of an update.

At step 712, model input can be generated for each test case using the description and change history encodings. By way of a non-limiting example, test case model input encoder 112 can merge encoded description 408, 508 and encoded change history 416 determined for a test case to generate an encoding for the test case. In accordance with one or more embodiments, unlike a training instance's encoding, a test case encoding used as input to failure prediction model 114 does not include an encoded status 406, 506. In accordance with one or more embodiments, the failure propensity score 116 can be used as a prediction of the execution status, or outcome. That is, the failure propensity score 116 can be used as a predictor of status 308 (e.g. an indicator of the success or failure in execution of a test case).

In accordance with one or more embodiments, a failure prediction model 114 can be trained to determine a failure propensity score 116 for a given test case using the encoding generated for the given test case by test case model input encoder 112.

Figure 8:
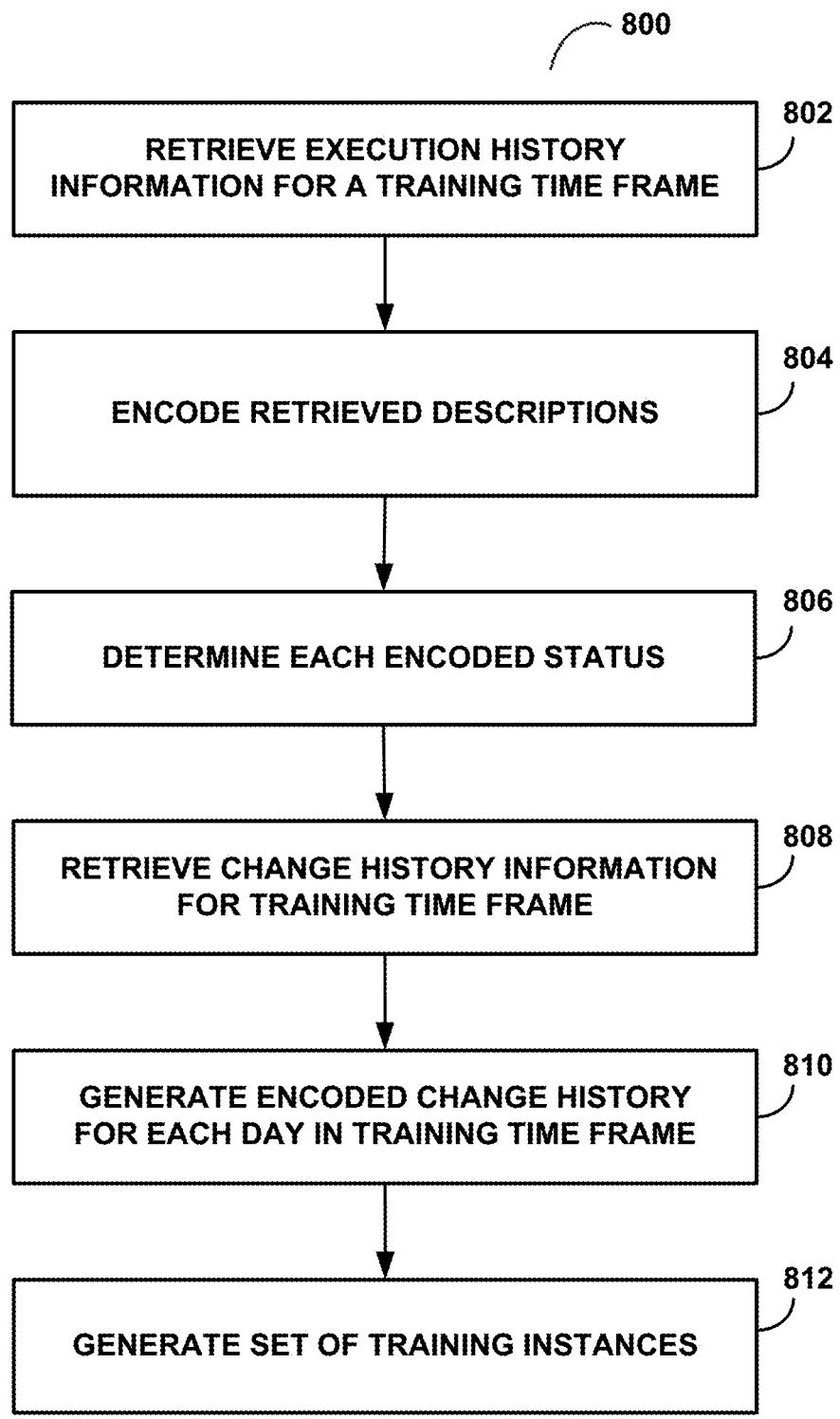
FIG. 8 provides a training instance generation process flow in accordance with one or more embodiments of the present disclosure.

FIG. 8 provides a failure prediction model training process flow in accordance with one or more embodiments of the present disclosure.

As discussed in connection with FIG. 2, failure prediction model training can use information from execution history 102 and change history 104. Information retrieved from execution history 102 and change history 104 can be used to generate the training data, and the retrieved information can correspond to a particular time frame—e.g., a predetermined, or other, time frame. In accordance with one or more embodiments, information retrieved from execution history 102 and change history 104 can be used to generate testing data to test the trained model, and the retrieved information used to generate the testing data can correspond to another (e.g., predetermined) time frame.

Embodiments of the present disclosure can map execution information with change history information by matching temporal information, and generate training data using the mapping. In accordance with one or more embodiments of the present disclosure, the training data can include a code issue indicator determined by status encoder 204 using the historical execution information. In accordance with one or more such embodiments, the encoded status 406, 506 determined by status encoder 204 can be used to generate a supervised learning label for each training data instance indicating the status (or outcome) of execution of a test case.

At step 802 of process 800, execution history can be retrieved for a training time frame. By way of a non-limiting example, the training time frame can be a predetermined time frame for training data, which time frame can be some number of weeks, months, years, etc. Example 302 provides some non-limiting examples of information that can be retrieved from execution history 102. In accordance with one or more embodiments, the execution history can be retrieved by description encoder 108.

At step 804, the retrieved descriptions can be encoded. By way of a non-limiting example, description encoder 108 can generate an encoded description 408, 508 for each test description 304 (retrieved from execution history 102). Each encoded description 408, 508 can be generated by description encoder 108 in a manner described herein. Description encoder 108 need not generate any duplicate encoded descriptions.

At step 806, each encoded status can be determined. By way of a non-limiting example, for each build date and test case, status encoder 204 can determine an encoded status 406, 506 using a corresponding status 308 and status message 310 in a manner described herein.

At step 808, change history information can be retrieved for the training time frame, i.e., the time frame determined for retrieval of training data. By way of a non-limiting example, change history encoder 110 can retrieve the change history information from change history 104 using the given time frame. Example 312 provides some examples of information that can be retrieved from change history 104 by change history encoder 110.

At step 810, an encoded change history can be generated for each day in the training time frame. By way of a non-limiting example, change history encoder 110 can use each file name 316 and corresponding commit (or save) date 314 to generate encoded change history 416, 516 for each date (e.g., each day with source code changes) in the training time frame. Change history encoder 110 can determine encoded change history 416, 516 in a manner described herein.

At step 812, a set of training instances can be generated. By way of a non-limiting example, training data encoder 206 can use build date 404 and date 414 to match an encoded status 506, encoded description 508 and encoded change history 516 to generate a training instance in a manner described herein.

In accordance with one or more embodiments, the training instances generated at step 812 can be used in a manner described herein to train failure prediction model 114 to generate a failure propensity score 116 in response to test case model input encoded in a manner described herein.

Figure 9:
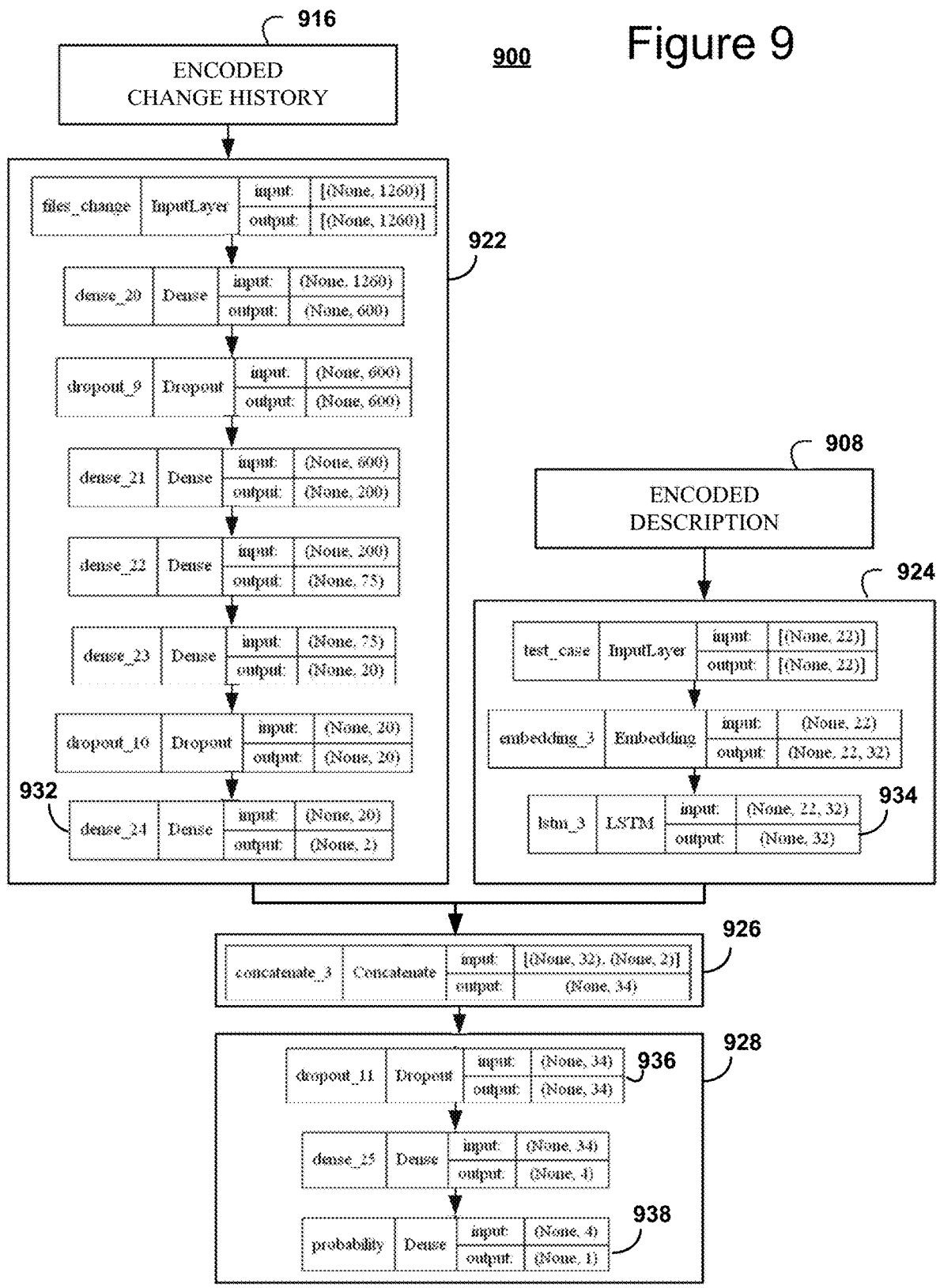
FIG. 9 provides an illustration of a deep learning model architecture for determining a failure propensity score in accordance with one or more embodiments of the present disclosure.

FIG. 9 provides an illustration of a deep learning model architecture for determining a failure propensity score (e.g., failure propensity score 116) in accordance with one or more embodiments of the present disclosure. In accordance with one or more embodiments, the deep learning model architecture shown in example 900 of FIG. 9 can comprise components 922, 924, 926 and 928. Component 922 can be a Feed Forward Neural Network (FFNN), component 924 can include a Long Short-Term Memory (LSTM), and component 928 can be a FFNN. Component 926 can be a concatenator configured to concatenate output from components 922 and 924 and provide the resulting concatenation to component 928.

By way of a non-limiting example, failure prediction model 114 can comprise components 922, 924 and 928 of the deep learning model architecture shown in example 900. By way of another non-limiting example, failure prediction model 114 can comprise components 922, 924, 926 and 928 of the deep learning model architecture shown in example 900.

In example 900 of FIG. 9, model component 922 can be a FFNN with input and output layers and a number of inner layers. Model component 922 can receive an encoded change history 916 (which can correspond to encoded change history 416, 516) via an input layer (e.g., labeled "files_change" in example 900). As shown in example 900, component 922 can include a number of inner layers—i.e., the dense and dropout layers shown in example 900. Each dense layer can be used to add additional learning capacity, and each dropout layer can be used to avoid overfitting. The output of layer 932 of component 922 (labeled "dense_24") can comprise an encoded change history feature set (e.g., based on encoded change history 916), which can be provided to component 926.

In addition, in example 900, model component 924 can comprise an input layer (e.g., the layer labeled "test_case") which can receive an encoded description 908 (which can correspond to encoded description 408, 508) as input. Component 924 can comprise an embedding layer which can provide input to an LSTM layer 934. The output of LSTM layer 934 can comprise an encoded description feature set (e.g., based on encoded description 908) that can be provided to component 926.

Component 926 can be a concatenator which can be used to concatenate the encoded change history feature set received by component 926 from component 922 and the encoded description feature set output received from component 924. Component 926 can be configured to generate a concatenation of the feature sets received from components 922 and 924 and provide the concatenation to component 928.

Component 928 (which can be a FFNN) can use the concatenation output from component 926 to generate failure propensity score 116. As shown in the example, component 928 can comprise a number of layers: an input layer 936 (which can be a dropout layer and can receive the concatenation comprising the concatenated feature sets output from component 926), an inner layer (which can be a dense layer) and a probability layer 938, which can be used to generate a failure propensity score 116 as output.

By way of a non-limiting example, layer 938 can comprise a sigmoid activation function, which can generate the failure propensity score 116. By way of a further non-limiting example, the score generated by layer 938 can be a value in a range of 0 and 1 indicating a likelihood of failure of a respective test case. For example, a failure propensity score 116 that is closer to 1 can indicate a higher propensity for failure than a score that is closer to 0. It should be apparent that a score closer to 0 can be used to indicate a higher propensity to fail while and score closer to 1 can indicate a lower propensity to fail.

Figure 10:
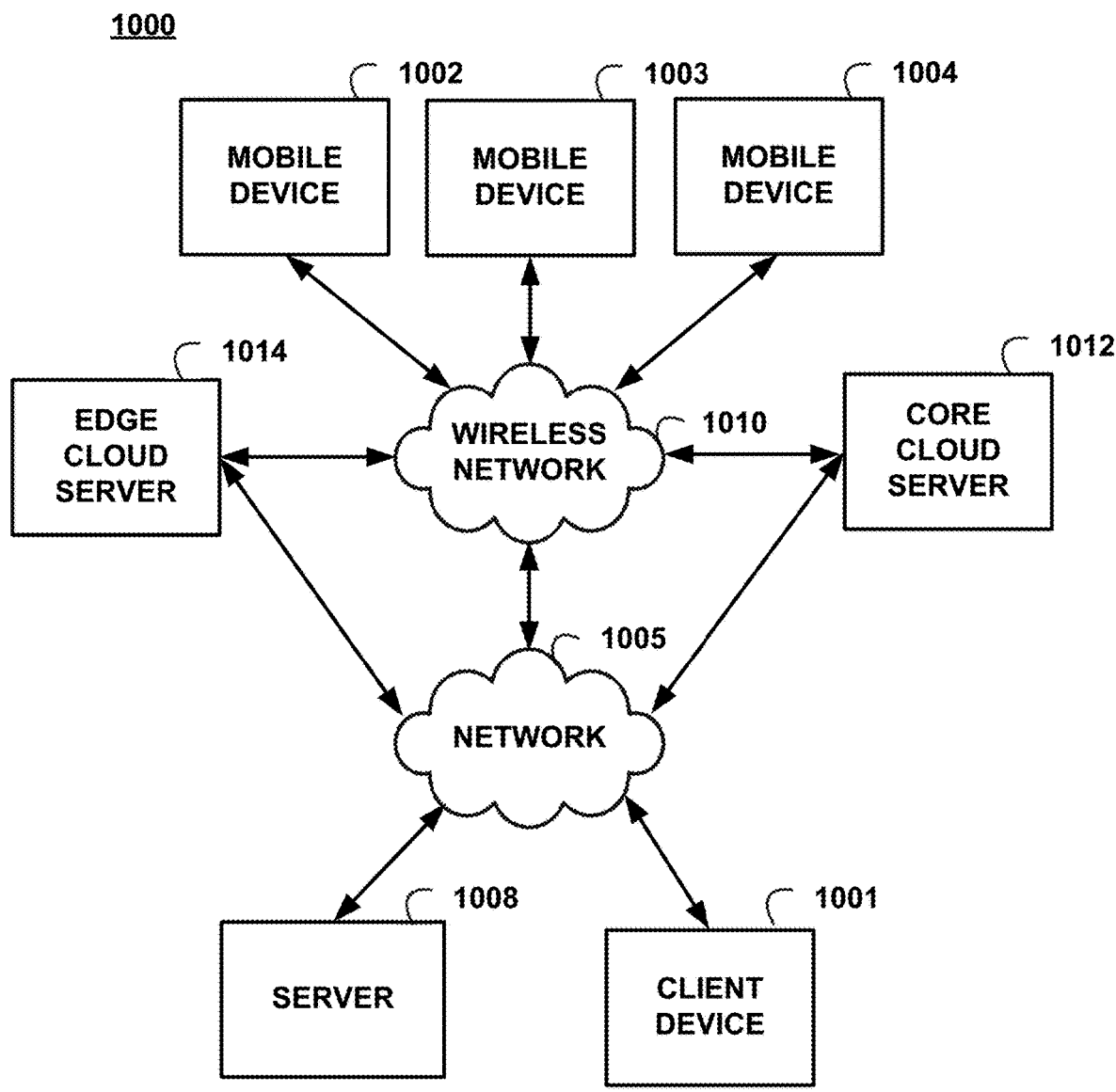
FIG. 10 is a schematic diagram illustrating an example of a network within which the systems and methods disclosed herein could be implemented according to some embodiments of the present disclosure.

FIG. 10 provides an example of components of a general environment in accordance with one or more embodiments. FIG. 10 shows components of a general environment in which the systems and methods discussed herein may be practiced. Not all the components may be required to practice the disclosure, and variations in the arrangement and type of the components may be made without departing from the spirit or scope of the disclosure. As shown, system 1000 of FIG. 10 includes local area networks ("LANs")/wide area networks ("WANs")-network 1005, wireless network 1010, mobile devices (client devices) 1002-1004 and client device 1001. FIG. 10 additionally includes a server 1008. Examples of web servers include without limitation, application servers, content servers, search servers, advertising servers, etc.

In accordance with one or more embodiments, one or more of server 1008, edge server 1014 and core server 1012 can include functionality disclosed herein in connection with one or more embodiments. One or more of the servers can host one or more web applications.

In accordance with at least one embodiment, core server 1012 and edge server 1014 can be configured to provide a cloud computing service for user devices (e.g., mobile devices 1002-1004, client device 1001, etc.) of registered users. Generally, core server 1012 can manage user device data and persistent core device instances for registered user devices, perform tasks, facilitate handoffs between edge servers 1014, etc. In accordance with at least one embodiment, the edge server 1014 is a component of (and be located at) a cellular base station (or cell site) of a mobile (e.g., cellular) network with which a registered user device is communicating.

One embodiment of mobile devices 1002-1004 is described in more detail below. Generally, however, mobile devices 1002-1004 may include virtually any portable computing device capable of receiving and sending a message over a network, such as network 1005, wireless network 1010, or the like. Mobile devices 1002-1004 may also be described generally as client devices that are configured to be portable. Thus, mobile devices 1002-1004 may include virtually any portable computing device capable of connecting to another computing device and receiving information. Such devices include multi-touch and portable devices such as, cellular telephones, smart phones, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 1002-1004 also may include at least one client application that is configured to receive content from another computing device. The client application may include a capability to provide and receive textual content, graphical content, audio content, and the like. In one embodiment, mobile devices 1002-1004 may uniquely identify themselves through any of a variety of mechanisms, including a phone number, Mobile Identification Number (MIN), an electronic serial number (ESN), or other mobile device identifier.

In some embodiments, mobile devices 1002-1004 may also communicate with non-mobile client devices, such as client device 1001, or the like. Client device 1001 may include virtually any computing device capable of communicating over a network to send and receive information. Thus, client device 1001 may also have differing capabilities for displaying navigable views of information.

Client device 1001 and mobile devices 1001-1004 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 1010 is configured to couple mobile devices 1002-1004 and its components with network 1005. Wireless network 1010 may include any of a variety of wireless sub-networks that may further overlay stand-alone ad-hoc networks, and the like, to provide an infrastructure-oriented connection for mobile devices 1002-1004. Such sub-networks may include mesh networks, Wireless LAN (WLAN) networks, cellular networks, and the like.

Network 1005 is configured to communicatively couple web server 1008 with other computing devices, including, client device 1001, and through wireless network 1010 to mobile devices 1002-1004. Network 1005 is enabled to employ any form of computer readable media for communicating information from one electronic device to another. Also, network 1005 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

A server, such as server 1008, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers, such as web server 1008 as well as other servers, such as and without limitation authentication servers, search servers, email servers, social networking services servers, SMS servers, IM servers, MMS servers, exchange servers, photo-sharing services servers, and travel services servers, via the network 1005 using their various devices 1001-1004. In some embodiments, application server can host applications, such as an e-commerce application, a search engine, a content recommendation and/or distribution application, etc.

In some embodiments, web server 1008 can store various types of applications and application related information including application data. As is discussed in more detail below, examples of application data include user behavior, application behavior, page visitation sequences, and visit intent and action data. In accordance with some embodiments, web server 1008 can host an application, or applications, embodying functionality described herein.

Moreover, although FIG. 10 illustrates web server 1008 as single computing devices, respectively, the disclosure is not so limited. For example, one or more functions of web server 1008 may be distributed across one or more distinct computing devices. Moreover, in one embodiment, web server 1008 may be integrated into a single computing device, without departing from the scope of the present disclosure.

Figure 11:
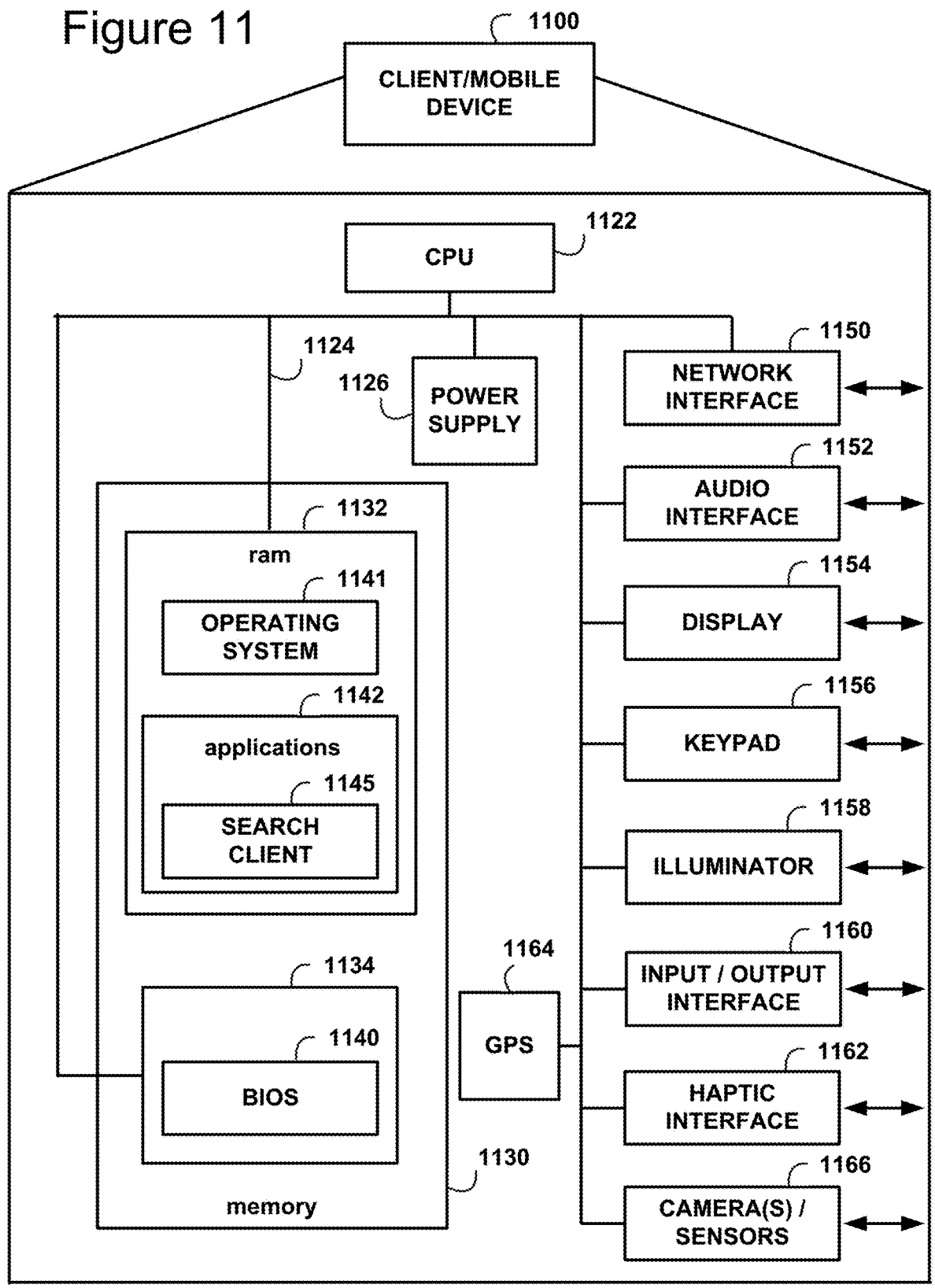
FIG. 11 depicts is a schematic diagram illustrating an example of client device in accordance with some embodiments of the present disclosure.

FIG. 11 is a schematic diagram illustrating an example embodiment of a computing device that may be used within the present disclosure. Device 1100 may include many more or less components than those shown in FIG. 11. However, the components shown are sufficient to disclose an illustrative embodiment for implementing the present disclosure. Device 1100 may represent, for example, client device 1001 and mobile devices 1002-1004 discussed above in relation to FIG. 10.

As shown in the figure, device 1100 includes a processing unit (CPU) 1122 in communication with a mass memory 1130 via a bus 1124. Device 1100 also includes a power supply 1126, one or more network interfaces 1150, an audio interface 1152, a display 1154, a keypad 1156, an illuminator 1158, an input/output interface 1160, a haptic interface 1162, an optional global positioning systems (GPS) transceiver 1164 and a camera(s) or other optical, thermal or electromagnetic sensors 1166. Device 1100 can include one camera/sensor 1166, or a plurality of cameras/sensors 1166, as understood by those of skill in the art. The positioning of the camera(s)/sensor(s) 1166 on device 1100 can change per device 1100 model, per device 1100 capabilities, and the like, or some combination thereof.

Optional GPS transceiver 1164 can determine the physical coordinates of device 1100 on the surface of the Earth, which typically outputs a location as latitude and longitude values. GPS transceiver 1164 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 1130 includes a RAM 1132, a ROM 1134, and other storage means. Mass memory 1130 illustrates another example of computer storage media for storage of information such as computer readable instructions, data structures, program modules or other data. Mass memory 1130 stores a basic input/output system ("BIOS") 1140 for controlling low-level operation of device 1100. The mass memory also stores an operating system 1141 for controlling the operation of device 1100.

Memory 1130 further includes one or more data stores, which can be utilized by device 1100 to store, among other things, applications 1142 and/or other data. For example, data stores may be employed to store information that describes various capabilities of device 1100. The information may then be provided to another device based on any of a variety of events, including being sent as part of a header during a communication, sent upon request, or the like.

Applications 1142 may include computer executable instructions which, when executed by device 1100, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 1142 may further include search client 1145 that is configured to send, to receive, and/or to otherwise process a search query and/or search result using any known or to be known communication protocols. Although a single search client 1145 is illustrated it should be clear that multiple search clients may be employed.

Figure 12:
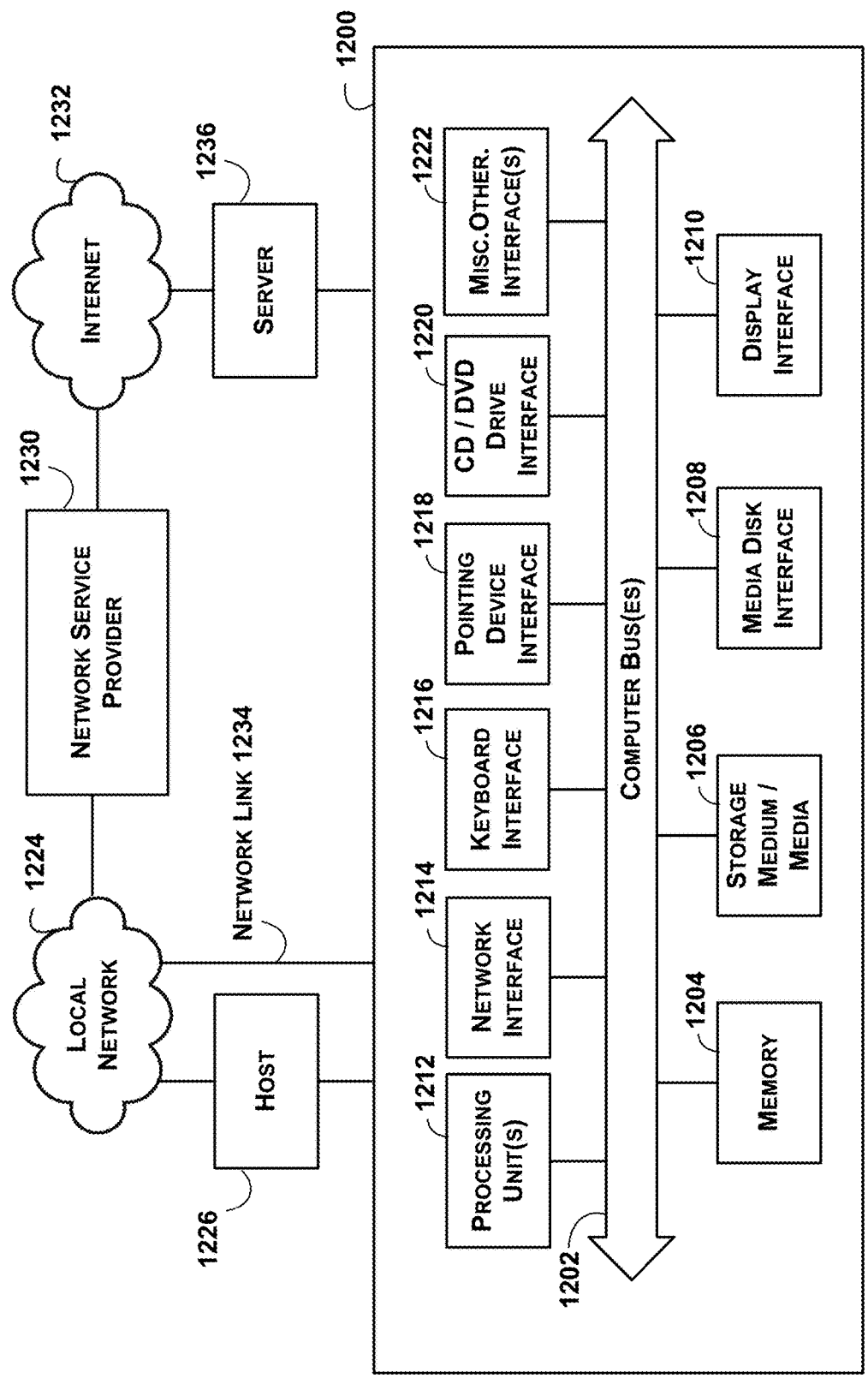
FIG. 12 is a block diagram illustrating the architecture of an exemplary hardware device in accordance with one or more embodiments of the present disclosure.

As shown in FIG. 12, internal system 1200 architecture of a computing device(s), computing system, computing platform, user devices, set-top box, smart TV and the like includes one or more processing units, processors, or processing cores, (also referred to herein as CPUs) 1212, which interface with at least one computer bus 1202. Also interfacing with computer bus 1202 are computer-readable medium, or media, 1206, media disk interface 1208, network interface 1214, memory 1204, e.g., random access memory (RAM), run-time transient memory, read only memory (ROM), media disk drive interface 1220 as an interface for a drive that can read and/or write to media, display interface 1210 as interface for a monitor or other display device, keyboard interface 1216 as interface for a keyboard, pointing device interface 1218 as an interface for a mouse or other pointing device, and miscellaneous other interfaces 1222 not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise source code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1234 typically provides information communication using transmission media through one or more networks to other devices that use or process the information. For example, network link 1234 may provide a connection through local network 1224 to a host computer 1226 or to equipment operated by a Network or Internet Service Provider (ISP) 1230. ISP equipment in turn provides data communication services through the public, worldwide packet-switching communication network of networks now commonly referred to as the Internet 1232.

A computer called a server 1236 connected to the Internet 1232 hosts a process that provides a service in response to information received over the Internet 1232. For example, server 1236 can host a process that provides information representing video data for presentation at a display via display interface 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and computer-executable application program code, may be read into memory 1204 from another computer-readable medium 1206 such as a storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including computer-executable application program code, through the networks, among others, through network link and communications interface. In an example using the Internet, a server host transmits computer-executable application program code for a particular application, requested by a message sent from computer, through Internet, ISP equipment, local network and communications interface. The received code may be executed by processor 1212 as it is received, or may be stored in memory 1204 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer-executable application program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
obtaining, by a computing device, execution history information and change history information for each test case of a plurality of test cases, wherein the execution history information comprises description information and the change history information comprises source code change information;
generating, by the computing device, an encoding for each test case of the plurality of test cases using the description information and change history information corresponding to each respective test case;
determining, by the computing device, a failure propensity score for each test case of the plurality of test cases using the respective encoding of each test case as input to a trained failure prediction model, wherein the trained failure prediction model is trained using a plurality of training instances, each training instance comprising an encoded description, an encoded change history and an encoded status;
determining, by the computing device, a prioritization of the plurality of test cases in accordance with the failure propensity score determined for each test case, a first test case having a greater failure propensity score indicating a greater propensity to fail having a higher priority than another test case with a lower propensity to fail; and
generating, by the computing device, a testing schedule for the plurality of test cases in accordance with the test case prioritization.

2. The method of claim 1, further comprising:
generating an encoded description for each test case of the plurality of test cases using the description information corresponding to each respective test case; and
generating an encoded change history for each test case of the plurality of test cases using the change history information corresponding to each respective test case, wherein each test case's encoded change history identifies each source code change corresponding to the test case.

3. The method of claim 2, generating a plurality of encodings further comprising:
generating, by the computing device, the encoding for each test case of the plurality of test cases by merging the test case's corresponding encoded description and the corresponding encoded change history.

4. The method of claim 1, further comprising:
obtaining, by the computing device, a plurality of descriptions, each description of the plurality of descriptions having an associated build date within a training time frame;
obtaining, by the computing device, an execution status and a status message corresponding to each description of the plurality of descriptions, each status message providing information about a corresponding execution status;
obtaining, by the computing device, change history training information for the training time frame, wherein the change history training information comprising a plurality of source code changes, wherein each source code change of the plurality of source code changes has an associated date within the training time frame;
generating, by the computing device, a plurality of encoded descriptions corresponding to the plurality of descriptions, wherein each encoded description has an associated build date corresponding to the description used to generate the encoded description;
generating, by the computing device, a plurality of encoded change histories corresponding to the obtained change history training information, wherein an encoded source code change has an associated date within the training time frame and indicates each source code change corresponding to the associated date;
generating, by the computing device, a plurality of encoded statuses, wherein each encoded status is associated with a description of the plurality of descriptions and is generated using the execution status and the corresponding status message associated with the description; and
generating, by the computing device, the plurality of training instances, wherein each training instance is associated with a date within the training time frame and comprises an encoded description from the plurality of encoded descriptions, an encoded change history from the plurality of encoded change histories and an encoded status from the plurality of encoded statuses.

5. The method of claim 4, wherein generating the plurality of training instances further comprises:
identifying, by the computing device, a first encoded change history of the plurality of encoded change histories having an associated date matching a given encoded description's associated build date; and
using, by the computing device, the given encoded description, the identified first encoded change history and the encoded status associated with the given description to generate a first training instance of the plurality of training instances.

6. The method of claim 4, wherein each encoded description of the plurality of encoded descriptions comprises a set of values, each value in the set of values corresponding to a vocabulary element found in the description used in generating the encoded description.

7. The method of claim 6, further comprising generating a mapping for each vocabulary element of a description vocabulary, wherein the mapping for the vocabulary element of the description vocabulary associates the vocabulary element with an encoding value.

8. The method of claim 4, wherein a first encoded change history of the plurality of encoded change histories is associated with a date in the training time frame and comprises a plurality of indicators, each indicator corresponding to a file comprising source code and indicating whether or not the file was updated on the associated date.

9. The method of claim 1, determining a failure propensity score further comprising:
- determining, by the computing device, an encoded change history feature set for a respective test case using an encoded change history determined for the respective test case and a first component of the failure prediction model, the first component comprising a first Feed Forward Network (FFNN) configured to determine the encoded change history feature set;
- determining, by the computing device, an encoded description feature set for the respective test case using an encoded description determined for the respective test case and a second model component of the failure prediction model, the second model component comprising a Long Short-Term Memory (LSTM) configured to generate the encoded description feature set;
- determining, by the computing device, a concatenation of the encoded description and change history feature sets using a concatenation component of the failure propensity model, the concatenation component configured to generate the concatenation; and
- determining, by the computing device, the failure propensity score for the respective test case using a fourth component of the failure propensity model, the fourth component comprising a second FFNN configured to determine the failure propensity score using the concatenation.

10. The method of claim 1, causing the scheduling of the plurality of test cases further comprising:
- identifying, by the computing device, at least one test case of the plurality of test cases having a first failure propensity score that fails to satisfy a failure propensity threshold; and
- removing, by the computing device, the at least one test case from the testing schedule.

11. The method of claim 1, further comprising:
- comparing the failure propensity score to information indicating a known outcome to determine accuracy of the failure propensity score; and
- updating the failure propensity model when the accuracy is below a particular threshold.

12. A non-transitory computer-readable storage medium tangibly encoded with computer-executable instructions that when executed by a processor associated with a computing device perform a method comprising:
- obtaining execution history information and change history information for each test case of a plurality of test cases, wherein the execution history information comprises description information and the change history information comprises source code change information;
- generating an encoding for each test case of the plurality of test cases using the description information and change history information corresponding to each respective test case;
- determining a failure propensity score for each test case of the plurality of test cases using the respective encoding of each test case as input to a trained failure prediction model, wherein the trained failure prediction model is trained using a plurality of training instances, each training instance comprising an encoded description, an encoded change history and an encoded status;
- determining a prioritization of the plurality of test cases in accordance with the failure propensity score determined for each test case, a first test case having a greater failure propensity score indicating a greater propensity to fail having a higher priority than another test case with a lower propensity to fail; and
- generating a testing schedule for the plurality of test cases in accordance with the test case prioritization.

13. The non-transitory computer-readable storage medium of claim 12, the method further comprising:
- generating a plurality of encoded descriptions for the plurality of test cases, generating an encoded description for a test case of the plurality of test cases comprising encoding the description corresponding to the test case; and
- generating an encoded change history for each test case of the plurality of test cases using the change history information, wherein, for a test case of the plurality of test cases, an encoded change history identifies each source code change corresponding to the test case.

14. The non-transitory computer-readable storage medium of claim 13, generating a plurality of encodings further comprising:
- generating the encoding for each test case of the plurality of test cases by merging the test case's corresponding encoded description and the corresponding encoded change history.

15. The non-transitory computer-readable storage medium of claim 14, further comprising:
- obtaining a plurality of descriptions, each description of the plurality of descriptions having an associated build date within a training time frame;
- obtaining an execution status and a status message corresponding to each description of the plurality of descriptions, each status message providing information about a corresponding execution status;
- obtaining change history training information for the training time frame, wherein the change history training information comprising a plurality of source code changes, wherein each source code change of the plurality of source code changes has an associated date within the training time frame;
- generating, a plurality of encoded descriptions corresponding to the plurality of descriptions, wherein each encoded description has an associated build date corresponding to the description used to generate the encoded description;
- generating, by the computing device, a plurality of encoded change histories corresponding to the obtained change history training information, wherein an encoded source code change has an associated date within the training time frame and indicates each source code change corresponding to the associated date;
- generating a plurality of encoded statuses, wherein each encoded status is associated with a description of the plurality of descriptions and is generated using the execution status and the corresponding status message associated with the description; and
- generating the plurality of training instances, wherein each training instance is associated with a date within the training time frame and comprises an encoded description from the plurality of encoded descriptions, an encoded change history from the plurality of encoded change histories and an encoded status from the plurality of encoded statuses.

16. The non-transitory computer-readable storage medium of claim 12, causing the scheduling of the plurality of test cases further comprising:

identifying at least one test case of the plurality of test cases having a first failure propensity score that fails to satisfy a failure propensity threshold; and removing the at least one test case from the testing schedule.

17. The storage medium of claim 12, the processor performing a method further comprising:

comparing the failure propensity score to information indicating a known outcome to determine accuracy of the failure propensity score; and updating the failure propensity model when the accuracy is below a particular threshold.

18. A computing device comprising:

a processor, configured to:

obtain execution history information and change history information for each test case of a plurality of test cases, wherein the execution history information comprises description information and the change history information comprises source code change information;

generate an encoding for each test case of the plurality of test cases using the description information and change history information corresponding to each respective test case;

determine a failure propensity score for each test case of the plurality of test cases using the respective encoding of each test case as input to a trained failure prediction model, wherein the failure prediction model is trained using a plurality of training instances, each training instance comprising an encoded description, an encoded change history and an encoded status;

determine a prioritization of the plurality of test cases in accordance with the failure propensity score determined for each test case, a first test case having a greater failure propensity score indicating a greater propensity to fail having a higher priority than another test case with a lower propensity to fail; and generate a testing schedule for the plurality of test cases in accordance with the test case prioritization.

19. The computing device of claim 18, the processor further configured to:

generate an encoded description for each test case of the plurality of test cases using the description information corresponding to each respective test case; and generate an encoded change history for each test case of the plurality of test cases using the change history information corresponding to each respective test case, wherein each test case's encoded change history identifies each source code change corresponding to the test case.

20. The computing device of claim 19, generating a plurality of encodings further comprising:

generate the encoding for each test case of the plurality of test cases by merging the test case's corresponding encoded description and the corresponding encoded change history.

* * * * *